US006994589B2

United States Patent
Schliese

(10) Patent No.: US 6,994,589 B2
(45) Date of Patent: Feb. 7, 2006

(54) METHOD FOR PRODUCTION OF A GAS-TIGHT DUCTING FOR A CONTACT THROUGH A WALL AND DEVICE FOR DUCTING AN ELECTRICAL CONTACT THROUGH A WALL

(75) Inventor: Oliver Schliese, Schwerin (DE)

(73) Assignee: Siemens Aktiengesellschaft, (DE)

( * ) Notice: Subject to any disclaimer, the term of this patent is extended or adjusted under 35 U.S.C. 154(b) by 0 days.

(21) Appl. No.: 10/480,689

(22) PCT Filed: May 29, 2002

(86) PCT No.: PCT/DE02/01981

§ 371 (c)(1),
(2), (4) Date: Dec. 10, 2003

(87) PCT Pub. No.: WO02/100673

PCT Pub. Date: Dec. 19, 2002

(65) Prior Publication Data

US 2004/0166732 A1    Aug. 26, 2004

(30) Foreign Application Priority Data

Jun. 12, 2001   (DE) .................. 101 28 301

(51) Int. Cl.
*H01R 13/40* (2006.01)
(52) U.S. Cl. ................ 439/587; 439/271; 439/935
(58) Field of Classification Search ........ 439/586–590, 439/559, 271–273, 281, 935, 278
See application file for complete search history.

(56) References Cited

U.S. PATENT DOCUMENTS

| 3,243,835 | A | * | 4/1966 | Armentrout et al. ........... 16/2.2 |
| 3,491,198 | A | * | 1/1970 | Mangels .................. 174/152 R |
| 3,685,005 | A |   | 8/1972 | D'Alessandro ............. 439/736 |
| 4,519,662 | A | * | 5/1985 | Riley et al. ................. 439/271 |
| 4,588,242 | A | * | 5/1986 | McDowell et al. ......... 439/589 |
| 4,759,459 | A |   | 7/1988 | Bailey et al. ............. 220/86 R |
| 5,041,019 | A | * | 8/1991 | Sharp et al. ................ 439/559 |
| 5,511,990 | A | * | 4/1996 | Klemen ...................... 439/559 |
| 5,633,531 | A |   | 5/1997 | Hornig et al. .............. 257/699 |
| 5,704,799 | A | * | 1/1998 | Wood ........................ 439/281 |
| 5,803,764 | A |   | 9/1998 | Ness .......................... 439/501 |
| 5,957,725 | A |   | 9/1999 | Bianca et al. ............... 439/590 |

(Continued)

FOREIGN PATENT DOCUMENTS

DE        26 15 857 C2     3/1986

(Continued)

OTHER PUBLICATIONS

Translation of German Patent Document DE4113701A1.*

(Continued)

*Primary Examiner*—Michael C. Zarroli
(74) *Attorney, Agent, or Firm*—Richard A. Speer; Mayer, Brown, Rowe & Maw LLP

(57) ABSTRACT

The invention relates to a method for production of a gas-tight ducting for a contact (4) through a wall (12), in particular in a fuel tank and a device for said ducting. According to the method, the contact is placed in a tool form (1), in which a partial region of the contact (4) is surrounded by a cover (9) made from an insulating material. The cover (9) is then directly or indirectly connected to the wall (12). According to the invention, the device embodies the contact (4) and the cover (9) thereof as a unitary construct.

1 Claim, 1 Drawing Sheet

U.S. PATENT DOCUMENTS

| | | | |
|---|---|---|---|
| 5,967,841 A | 10/1999 | Bianca et al. | 439/590 |
| 6,152,745 A * | 11/2000 | Matsumoto et al. | 439/98 |
| 6,273,754 B1 * | 8/2001 | Bunch et al. | 439/587 |
| 6,280,208 B1 * | 8/2001 | Masuda et al. | 439/98 |

FOREIGN PATENT DOCUMENTS

| | | |
|---|---|---|
| DE | 33 44 679 C2 | 1/1987 |
| DE | 40 17 725 C2 | 3/1992 |
| DE | 41 13 701 A1 | 10/1992 |
| DE | 196 14 706 C2 | 2/1998 |
| DE | 299 18 994 U1 | 1/2000 |
| DE | 695 17 115 T2 | 2/2001 |
| DE | 697 04 252 T2 | 2/2001 |
| DE | 40 13 509 A1 | 10/2001 |
| DE | WO 02/058954 A1 | 8/2002 |
| JP | 2000145595 | 5/2000 |

OTHER PUBLICATIONS

Translation of German Patent Document DE3344679C2.*

* cited by examiner

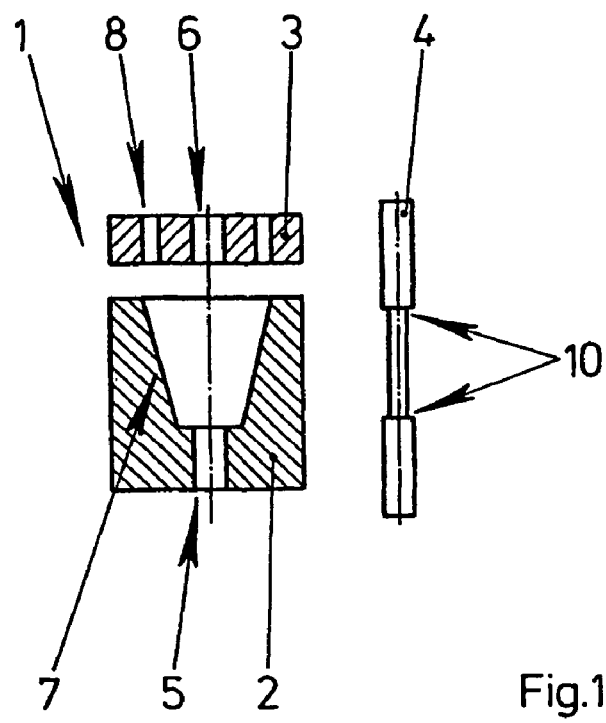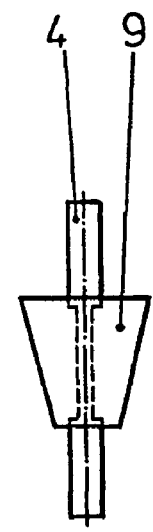
Fig. 1    Fig. 2
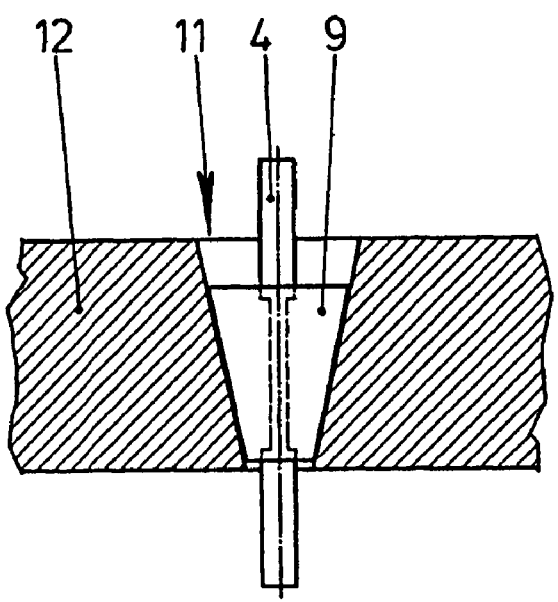
Fig. 3

METHOD FOR PRODUCTION OF A GAS-TIGHT DUCTING FOR A CONTACT THROUGH A WALL AND DEVICE FOR DUCTING AN ELECTRICAL CONTACT THROUGH A WALL

The invention relates to a method for production of a gas-tight ducting for a contact through a wall, in particular a wall of a fuel tank. Furthermore, the invention relates to a device for ducting an electrical contact through a wall, in particular a wall of a fuel tank.

In ductings known from practice, contacts are generally pressed through the wall, which is manufactured from plastic, or through a support connected to the wall, so that one end of the contacts protrudes on each side of the wall. Electric leads can then be connected to the contacts on both sides of the wall.

A disadvantage of the known device is that the connection of the contacts to adjacent regions of the wall or of the support can be sealed only with very great difficulty. In the case of the device provided for the fuel tank, fuel vapors can diffuse through between the contacts and adjacent regions of the support or of the wall. This enables fuel to pass from the fuel tank into the environment.

The invention is based on the problem of developing a method of the type mentioned at the beginning in such a manner that the contacts which one to be ducted through the wall can be sealed in a particularly reliable manner. Furthermore, a device of the type mentioned at the beginning in which the contacts are reliably sealed with respect to adjacent regions is to be provided.

The problem mentioned first is solved according to the invention by the contact being placed into a mold and a partial region of the contact being surrounded in the mold by a covering made from an insulating material, and by the covering then being connected indirectly or directly to the wall.

By this means, a preassemblable, constructional unit comprising contact and insulator is produced in the mold. The surrounding of the contact in the mold makes it possible to ensure that the connection between the contact and the covering is particularly leakproof. A suitable method for manufacturing the covering makes it possible for the connection of the contact to the covering to be designed with a cohesive material joint.

In one advantageous refinement of the invention, the contact is produced by the mold by the contacts being supplied to the mold as strip material, for example, and not being detached or punched out until the mold is closed. A partial region of the contact is then surrounded by the covering in the mold.

According to one advantageous development of the invention, the covering can be manufactured from ceramic if the covering is produced by sintering. This enables the covering to have high temperature stability.

According to another advantageous development of the invention, the connection of the contact to the covering with a cohesive material joint can be ensured in a simple manner if the covering is produced by casting. This enables the covering to be manufactured from plastic or glass.

The second problem mentioned, namely the provision of a device in which the contacts are reliably sealed with respect to adjacent regions, is solved according to the invention by the contact and a covering which surrounds a partial region of the contact and is made from an insulating material being designed as a constructional unit.

This design makes it possible to reliably avoid leakages between the contact and adjacent regions. For assembly purposes, the unit can be inserted on a support, which is to be connected to the wall, or can be inserted directly in the wall. The material of the covering can be selected in such a manner that it can simply be sealed to the support or the wall.

According to one advantageous development of the invention, the covering can be fitted in the wall in a particularly simple manner if the covering has a conical form. The wall or the support thus requires a conical recess, into which the covering is pressed. Moreover, this compensates for tolerances between the recess in the wall or the support and the covering.

According to another advantageous development of the invention, a contribution is made to further increasing the reliability of the sealing of the contact by the covering if the contact and the covering are connected directly to each other with a cohesive material joint. The direct connection of the contact to the covering means that an adhesive or the like is not required for sealing purposes.

According to another advantageous development of the invention, the connection of the contact to the covering has good endurance if the contact has a cross-sectional change in the region of the covering.

The invention permits numerous embodiments. To further clarify its basic principle, one of these is illustrated in the drawing and will be described below. In the drawing FIG. 1 shows a contact together with a mold for carrying out the method according to the invention, FIG. 2 shows a device according to the invention with a constructional unit comprising a contact according to FIG. 1 and a covering, FIG. 3 shows the constructional unit from FIG. 2 after it has been fitted in a wall.

FIG. 1 shows a mold 1 with two mold parts 2, 3 and a contact 4. The mold 1 may, for example, be a casting mold or a sintering mold. The mold parts 2, 3 have a respective recess 5, 6 for holding the ends of the contact 4. One of the mold parts 2 has a conical recess 7. The other mold part 3 has openings 8 in which to place the material of a covering 9, which is illustrated in FIG. 2. The contact 1 has two cross-sectional changes 10 which, when the contact 4 is inserted into the mold 1, are situated within the conical recess 7. To manufacture the covering 9 which is illustrated in FIG. 2, the contact 4 is first of all inserted into one of the mold parts 2, 3 and the mold 1 is put together. The material forming the covering 9 is then introduced through the openings 8 into the conical recess 7 of the mold 1. This material can be introduced in a powdery, liquid or pasty state. The covering 9 is manufactured, for example, by sintering or by casting.

FIG. 2 shows the contact 4 together with the covering 9 after removal from the mold 1 from FIG. 1. The covering 9 forms a constructional unit with the contact 4. As illustrated in FIG. 3, this constructional unit can be pressed into a correspondingly designed recess 11 in a wall 12 or can be connected to the latter indirectly or directly with a cohesive material joint, for example by the action of heat.

What is claimed is:

1. A device for ducting a contact (4) through a wall of a fuel tank, characterized in that contact elements which are designed only for the connection of leads which lead away and a conically shaped covering (9) which is cohesively connected to the contact and is made from an insulating material are designed as a constructional unit to be bonded directly to the wall of the fuel tank, and in that the contact (4) has a cross-sectional change (10) in the region of the covering (9) and in that the contact (4) and the contact elements are designed as a single-piece element, the ends of the single-piece element protruding out of the covering (9) and forming the contact elements.

* * * * *